US010825196B2

(12) United States Patent
Lin et al.

(10) Patent No.: US 10,825,196 B2
(45) Date of Patent: Nov. 3, 2020

(54) OBJECT ORIENTATION DETECTION SYSTEM (71) Applicant: Universal City Studios LLC, Universal City, CA (US)

(72) Inventors: Yu-Jen Lin, Orlando, FL (US); Anthony Melo, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 36 days.

(21) Appl. No.: 16/277,049

(22) Filed: Feb. 15, 2019

(65) Prior Publication Data
US 2020/0265604 A1 Aug. 20, 2020

(51) Int. Cl.
G06T 7/73 (2017.01)
G06N 5/00 (2006.01)
G06K 9/00 (2006.01)
G06N 20/00 (2019.01)

(52) U.S. Cl.
CPC ............ G06T 7/73 (2017.01); G06K 9/00228 (2013.01); G06K 9/00369 (2013.01); G06N 20/00 (2019.01)

(58) Field of Classification Search
CPC ...... G06T 7/73; G06N 20/00; G06K 9/00369; G06K 9/00228
See application file for complete search history.

(56) References Cited

U.S. PATENT DOCUMENTS

| 6,179,619 | B1 | 1/2001 | Tanaka | |
| 2007/0121957 | A1* | 5/2007 | Trowbridge | A63G 31/00 381/61 |
| 2009/0234666 | A1 | 9/2009 | Crawford et al. | |
| 2009/0277295 | A1* | 11/2009 | Bryan | G05G 7/02 74/469 |
| 2011/0174189 | A1 | 7/2011 | Beutler | |
| 2012/0133754 | A1 | 5/2012 | Lee et al. | |
| 2013/0169560 | A1 | 7/2013 | Cederlund et al. | |
| 2015/0130740 | A1 | 5/2015 | Cederlund et al. | |

(Continued)

FOREIGN PATENT DOCUMENTS

KR 20170091216 A 1/2016

OTHER PUBLICATIONS

Mehling, vorgelegt von Michael; "Implementation of a Low Cost Marker Based Infrared Optical Tracking System", Diplomarbeit im Studiengang Audiovisuelle Medien, 2006, pp. 1-100.

(Continued)

Primary Examiner — Asghar H Bilgrami
(74) Attorney, Agent, or Firm — Fletcher Yoder, P.C.

(57) ABSTRACT

A face orientation system of a ride that includes one or more sensors and a controller. The controller receives ride cart data from the one or more sensors indicative of a presence and position of the ride cart on the ride, determines ride cart orientation based on the ride cart data, receives position data of a guest from the one or more sensors indicative of a position of a body, a face, or a combination thereof, of the guest, determines face orientation, face rotation, or a combination thereof, of the guest based on the ride cart orientation and position data, and transmits data indicative of the determined face orientation, face rotation, or a combination thereof to a downstream controller for subsequent control based upon the determined face orientation, face rotation, or the combination thereof.

21 Claims, 4 Drawing Sheets (56) References Cited

U.S. PATENT DOCUMENTS

2018/0104601 A1     4/2018  Wagner
2018/0304160 A1*   10/2018  White ..................... A63G 7/00
2019/0259014 A1*    8/2019  Katayama ............ G06Q 20/206

OTHER PUBLICATIONS

Arbabi, Ehsan, et al.; "A Low Cost Non-Wearable Gaze Detection System Based on Infrared Image Processing", School of Electrical and Computer Engineering College of Engineering, University of Tehran, Iran, 2017, p. 1-18.
Jiang, Boyi, et al.; "Deep Face Feature for Face Alignment", arXiv:1708.02721v2 [cs.CV] Mar. 12, 2018, pp. 1-11.
PCT/US2020/018157 International Search Report and Written Opinion dated May 13, 2020.

* cited by examiner

OBJECT ORIENTATION DETECTION SYSTEM

BACKGROUND

The present disclosure relates generally to the field of camera-based object detection. More specifically, embodiments of the present disclosure relate to systems and methods to identify object orientation using cameras.

In many instances, it may be useful to understand an orientation of an object. Traditionally, wearable devices or other known features of objects have been used to help facilitate orientation detection of objects. However, provision and utilization of wearable devices may be costly and cumbersome. Further, known features may vary from object to object and, thus, may be hard to detect and use as a reference.

For example, many amusement park-style rides include ride vehicles that carry passengers along a ride path, for example, defined by a track. Over the course of the ride, the ride path may include a number of features, including tunnels, turns, ascents, descents, loops, and so forth. The ride path may also include show scene features, such as lighting effects, animated figures or robotic figures that may provide supplemental content and/or enhance an immersive experiences for guests. However, due to the complexity of some amusement rides, determining a guest's body and/or face orientation within the ride, such as to activate or deactivate show scene features along the ride path when the guest is viewing the features, may be difficult without the use of guest wearable ride gear. Nevertheless, providing wearable ride gear may be costly and require additional time to implement as opposed to amusement park-style rides that do not use such gear.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

Embodiments described herein are related to a system that may track face orientation and future face rotation of guests on amusement park rides. As used herein, the term "face orientation" refers to a guest's head position with respect to a particular angle of rotation. The term "face rotation" refers to an actual movement or range of movements of the head to reach the particular angle of rotation. In some embodiments, the system may use a ride cart orientation on the ride in conjunction with skeletal tracking to determine the face orientation and rotation. In other embodiments, the system may use facial and/or body image detection to determine facial features along with face orientation and rotation. Moreover, machine learning may be used when determining a face orientation based on reoccurring determinations.

Though the discussion below primarily focuses on amusement park-style rides, this is not intended to limit the scope of the current invention. Indeed, the current object orientation detection system can be used in a number of different applications wholly different from amusement park-style rides.

In an embodiment, a face orientation system of a ride includes one or more sensors and a controller. The controller receives ride cart data from the one or more sensors indicative of a presence and position of the ride cart on the ride, determines a ride cart orientation based on the ride cart data, receives position data of a guest from the one or more sensors indicative of a position of a body, a face, or a combination thereof, of the guest, determines face orientation, face rotation, or a combination thereof, of the guest based on the ride cart orientation and position data, and transmits data indicative of the determined face orientation, face rotation, or a combination thereof to a downstream controller for subsequent control based upon the determined face orientation, face rotation, or the combination thereof.

In an embodiment, a method includes receiving ride cart data from one or more sensors indicative of a presence and position of a ride cart on a ride, determining a ride cart orientation based on the ride cart data, receiving position data of a guest from the one or more sensors indicative of a position of a body, a face, or a combination thereof, of the guest, determining face orientation, face rotation, or a combination thereof, of the guest based on the ride cart orientation and position data, and transmitting data indicative of the determined face orientation, face rotation, or a combination thereof to a downstream controller for subsequent control based upon the determined face orientation, face rotation, or the combination thereof.

In an embodiment, a tangible, non-transitory machine readable medium includes machine-readable instructions that when executed by one or more processors of the machine, cause the machine to: receive ride cart data from one or more sensors indicative of a presence and position of a ride cart on a ride, determine ride cart orientation based on the ride cart data, receive position data of a guest from the one or more sensors indicative of a position of a body, a face, or a combination thereof, of the guest, determine face orientation, face rotation, or a combination thereof, of the guest based on the ride cart orientation and position data, and transmit data indicative of the determined face orientation, face rotation, or a combination thereof to a downstream controller for subsequent control based upon the determined face orientation, face rotation, or the combination thereof.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Amusement parks feature a wide variety of entertainment, such as amusement park rides, performance shows, and games. The different types of entertainment may include show scene features, such as a themed scene along a ride path, that enhance a guest's experience at the amusement park. The show scene features may include effects, objects, or equipment along the ride path that are activated while guests are viewing the particular show scene. For example, a robotic figure along a ride path may include elements or objects that change or activate based on the detected presence of a cart and/or guest along the ride path. The show scene changes may include variations in animated equipment and changes in lighting, positioning of the ride cart, etc.

Typical show scene features (e.g., lighting, animations) activation may be triggered by limited information about an attraction and/or a guest viewing the show scene object along the ride path. For example, the trigger may be based on the positioning of a ride cart and/or guest. Thus, regardless of the guest positioning within the ride cart, the show scene features provided on the ride path may be turned on. This may result in a less personalized experience that is generically implemented for each iteration of the attraction.

However, it may be desirable to provide more granular triggers that provide more customized attraction changes based upon particular features of the attraction guests. Provided herein are techniques that facilitate the determination of a guest's face orientation and face turning while on a ride without the use of guest face or head gear while on the ride. The determination of a guest's face orientation and turning may be used to trigger or initialize show scene features. For example, show scene features, such as animations or special effects, may be provided in response to a guest's face oriented to be within a viewing range of a particular object or equipment on the ride path that provides the show scene feature. Generally, a ride cart moves along the ride path with a guest's body or head moving and turning to view features along the ride path. Effects and animations may be triggered to initialize in response to a detection of an active ride cart on the ride. However, providing precise guest's face orientation and face turnings at a particular position on the ride path, such as within a viewing range of objects or equipment that provide special effects or animations on the ride, may be complex.

It should be noted that although examples provided herein may be presented generally in an amusement park and ride attraction context, such as using the present guest face orientation determination techniques to facilitate activating features in a show scene on a ride path, the techniques in this disclosure may be applied to other non-amusement park related conditions and/or contexts. Thus, the present examples should be understood to merely reflect a real-world example of a face orientation system on rides in order to provide useful context for the discussion, and should not be viewed as limiting the applicability of the present approach. Instead, the present approach should be understood as being applicable to any situation in which precise orientation of moving (e.g., face turning) people or objects may be determined within in an environment for business purposes, entertainment purposes, etc.

Figure 1:
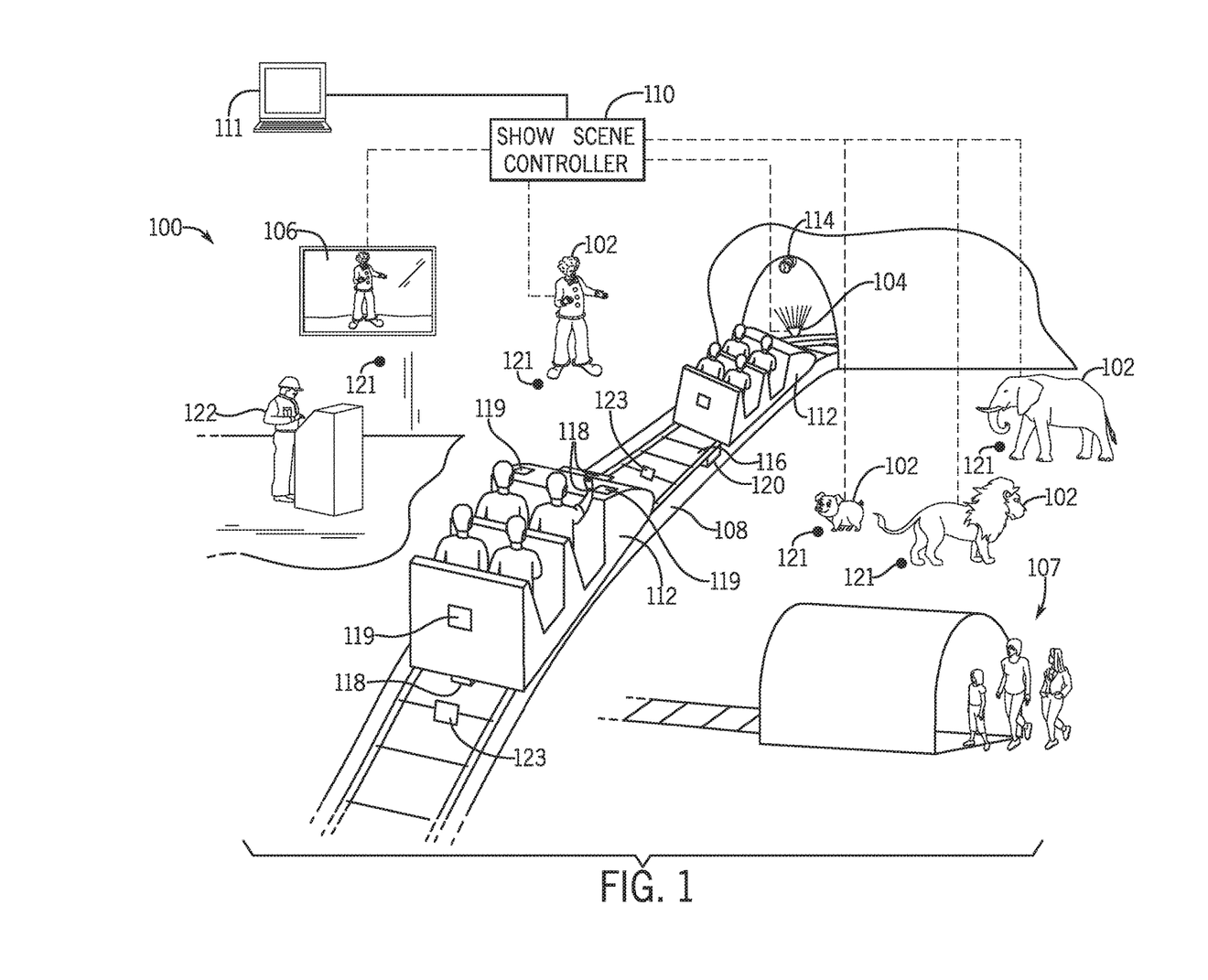
FIG. 1 is a block diagram of an amusement park ride including an attraction with a show scene along a ride path, in accordance with an embodiment of the present disclosure.

With the foregoing in mind, FIG. 1 is a block diagram of an amusement park ride 100 that may operate in conjunction with the disclosed face orientation system in accordance with the present embodiments. In particular, the amusement park ride 100 may include one or more ride carts 112 with or without guests, and a show scene feature along a ride path 108 that includes animated figures 102, the lighting effects 104, and displays 106. The show scene features may be activated to change based on a detected ride cart 112 orientation in conjunction with a riding guest's face orientation and/or head turning.

As depicted, the show scene features, such as the animated figures 102, the lighting effects 104, and the display 106, may be controlled to react via a show scene controller 110. In an embodiment, the show scene controller 110 of a face orientation system may be centralized and synced to at least one or more show scene features located throughout the ride path 108 of the amusement park ride 100 to control the one or more show scene features. The show scene controller 110 receives contextual positioning information (e.g., the ride cart 112 position and guest body and/or head position data) via one or more sensors and/or processors located on or around the show scene features, the ride cart 112, and/or the ride path 108. Using this information, face orientation may be determined by the face orientation system, as described in detail in FIG. 2

Once the face orientation is determined, a control signal may be sent to the one or more systems controlling the show scene features to trigger one or more of the show scene features based upon the face orientation. The contextual positioning information (e.g., sensed data indicating the ride cart 112 position on the ride track 116 and guest body and/or head position) may also be sent to a monitoring system 111. The monitoring system 111 may be an administrative system that not only monitors the show scene changes, such as animation or lighting control signals sent from the show scene controller 110 in response to the ride cart 112 orientation and face orientation, but may also control or reconfigure the show scene controller 110. In this manner, the monitoring system 111 may reset show scene feature changes or override animations and effects determined by the show scene controller 110. For example, the show scene controller 110 may automatically send an animation to an the animated figure 102 in response to a guest facing the animated figure 102, as discussed in detail in FIG. 2. Similarly, a ride operator 122 may manually stop an animation via a stopping mechanism (e.g., button) to override the animation if the ride operator 122 finds any issues with the animated 102 beyond those determined by the show scene controller 110. The monitoring system 111 may also be used to recalibrate sensors on or around the show scene. Moreover, the monitoring system 111 may be used to reset face orientation determination algorithms of the show scene controller 110. In certain embodiments, the monitoring system 111 and the show scene controller 110 may be implemented as a single controller.

As previously mentioned, the show scene controller 110 of the face orientation system may utilize a combination of sensor data received by sensors on or near show scene features, data from the ride cart 112, and/or the ride path 108 to detect positioning of the ride cart 112 and a guest's body/head, and to further determine face orientation, alignment, and/or estimate face rotation. The determination may be used to correspondingly control animations and effects produced throughout the show scene. Based on the orientation of the ride cart 112, a 3D map of a guest on the ride may be generated. The 3D map generation may be based on a known ride track 116 position and orientation, and known features within the ride 100 (e.g., the ride track 116 turns towards a show scene feature at a midpoint on the ride 100). For example, the 3D map may generate the ride cart's 112 orientation based on the ride track 116 positioning. Moreover, guest position data within the 3D map may be based on the ride cart 112 orientation and a known ride cart 112 structure (e.g., seats are forward facing as the ride cart 112 moves along the ride path 108). The 3D map may be used to reconstruct a 3D position of the guest and then accurately determine a face orientation, especially relative to known show scene features within the ride path 108. The 3D map may also determine where a head may be turning, such as to face show scene features that are expected to be viewed by the guest based on determined face orientation. Moreover, machine learning may be used to accurately predict a face position based on reoccurring determinations that are made using sensor data. Machine learning may further be used to predict face orientation based on learned face orientation of a guest during a specific point on the ride path 108 (e.g., face often positioned towards a particular show scene feature).

As shown, the ride cart 112 may be detected using radio frequency identification (RFID) tags 118 incorporated into the ride cart 112 or a guest wearable device, weight sensors 120 along the ride track 116, and/or the infrared (IR) markers 119 located on the ride cart 112. The RFID tags 118 may communicate with an electronic reader 123 incorporated at different places on the ride 100, such as on the ride track 116, to indicate presence of the tag. Thus, the electronic reader 123 placed on the ride path 108 may scan the RFID tag 118 on the ride cart 112 as the ride cart 112 passes over the electronic reader 123. Moreover, the RFID tags 118 may be placed at specific areas of the ride cart 112 and/or be different types of the RFID tags 118. In this manner, the RFID tag 118 placement and/or type may be used to determine the front and back of the ride cart 112. This information may be used to more accurately predict the position of a guest within the ride cart 112, such that faces may be predicted to be facing towards the front of the ride cart 112. Similarly, the IR markers 119 may also be placed on the ride cart 112. The IR markers 119 may include an IR reflective surface that may be optically invisible but that may be detected by one or more cameras 114. The cameras 114 may be equipped to detect IR radiation reflected from the marker. Moreover, the RFID tags or IR markers may be periodically placed on the ride track 116 or the ride path 108 at particular intervals or specific points of interest on the track. The cameras 114 that may be used to detect the ride cart 112 and/or guest's body and/or head positions, may be configured to activate after the ride cart 112 is approaching a particular camera's viewing range, thereby conserving power. Similarly, tracking the ride cart 112 at specific points on the ride track 116 may be used to activate or deactivate show scene features along the ride path 108. By way of example, the RFID tags 118 may indicate that the ride cart 112 is at the beginning of its journey and thus, show scene features located towards the end of the journey may be turned off. As the ride cart 112 approaches closer to a point of interest on the ride 100, such as a predetermined distance (e.g., 3 meters) to specific show scene features that may be determined using proximity sensors 121 or based on the 3D map, the show scene controller 110 may activate such features accordingly. Additionally or alternatively, the RFID tags 118 or the IR markers 119 may be placed such that the position of the ride cart 112 on the track (e.g., straight track or turning) may be determined.

Furthermore, guest wearable devices may also include the RFID tags 118 or the IR markers 119, which may be used to indicate guest presence in the ride cart 112 and further trigger face orientation determinations. By way of example, the electronic reader 123 for the guest wearable device may be placed on the seat of the ride cart 112 and indicate guest presence when scanned. Additionally or alternatively, the IR markers 119 on the guest wearable device may be detected by cameras using techniques previously described.

Weight sensors 120 may also be mounted on the ride track 116 to indicate presence of the ride cart 112 on the ride track 116 based on passing a predetermined weight threshold. After determining the ride cart 112 position using the techniques described above (e.g., the RFID tags 118, the IR markers 119) to generate the 3D map, the cameras 114 may view the area of interest, such as the position and/or location of the ride cart 112 within the ride path 108. Thus, capturing guest body and/or head position data may be limited to guests on the ride cart 112. Furthermore, since seat positions of the ride cart 112 may be known to the ride operator 122, the cameras 114 may be configured to narrow the viewing range to focus on a particular area around the seats. Thus, guest positioning may be determined by the ride cart 112 position and other sensor mechanisms as described herein, to precisely determine face orientation. Furthermore, the face orientation may be used to determine viewing direction within the ride path 108.

As shown, the camera 114 or a series of cameras 114 may be installed along the ride path 108 and throughout the amusement park ride 100 to determine one or more guests' body and/or head orientation. Although an array of cameras 114 are shown and discussed herein to detect guest orientation, a single camera 114 may be used. Moreover, in some embodiments, the single camera 114 may be used to determine the ride cart 112 positioning and orientation used to generate the 3D map in addition to or alternative to the techniques previously described.

The cameras 114 may be set up at a predetermined distance from show scene features, such as from the animated figures 102, the lighting effects 104, and the displays 106. Depending on the show scene feature, the predetermined distance may be a distance that may allow capturing a guest head and at least top half of the body, such as to allow precise determination of the head orientation (e.g., front of head, back of head, facing towards show scene feature). For example, the cameras 114 may view a 3 meter circumference around the animated figure 102. In this manner, any guests on the ride cart 112 near the animated figure 102 may be easily detected. Additionally or alternatively, the cameras 114 may be integrated into the show scene feature, such as the body of the animated figure 102. The integration may be positioned to allow a clear view of one or more guests to be perceived, whether the guests are stationed in front of or have past the animated figure 102 while in the ride cart 112. For example, integrating the cameras 114 into the eyes of the animated figure 102 may allow for detection of guests in front of it. Additionally or alternatively, the predetermined distance may not be uniform for all show scene features depending on the intended effect on the guest. By way of example, the lighting effects 104 along the ride path 108 may be switched on prior to the ride cart 112 and/or guests to be positioned in front of it. Thus, the one or more cameras 114 may determine guest presence at a further distance than for the animated figure 102. Moreover, the cameras 114 may be positioned in a manner that may allow excluding a view that may not include the guest of interest. For example, and as depicted, the ride operator 122 may operate the ride, such that guests waiting in a queue 107 for the ride 100 are signaled to enter the ride cart 112. Since the ride operator 122 and the guests in queue 107 are not on the ride 100 or in the ride cart 112, their face orientation relative to the show scene may not be of interest, and thus, excluded from the cameras 114 viewing range.

The cameras 114 may also be used to capture data used as inputs to one or more processes of the face orientation system as provided herein. In one example, the cameras 114 data may be used by the show scene controller 110 to detect a human body. That is, additionally or alternatively to generating a 3D map of the ride cart 112, the presence of the captured image may be used to determine the presence and positioning of any guests on the ride cart 112, and further determine face orientation. Skeletal tracking, is used at least in part to further determine guest body and/or face position on the ride cart 112. Skeletal tracking may include using real-time or captured images of guests on the ride cart 112 by the cameras 114, and comparing the images to recognized skeletal models to indicate a human skeleton detection. For example, the skeletal model may include relative positioning of essential joints, bones, and limbs of a human skeleton. Joints located closer together on the skeletal model may indicate that the body and/or face is turned towards the particular direction. Moreover, the skeletal model may be used to predict the guest's face orientation in the future based on present face and body positions. For example, if the skeletal model indicates that a face orientation is forward facing but the body is turned slightly right based on body and face joint positioning (e.g., shoulder joints closer together towards the right end of skeletal body), the face orientation may be predicted to also turn right. Moreover, the ride cart 112 data that indicates particular show scene features at points along the ride path 108 may be used in conjunction with the skeletal tracking to make future face rotation predictions (e.g., face likely to turn towards a known show scene feature). Thus, comparing captured images of guests and the skeletal model may be used for guest detection and body/face orientation. In some embodiments, a range of face rotation may be defined based upon the ride cart 112 orientation and/or the body orientation. For example, a typical guest may rotate their head a maximum head rotation (e.g., 90 degrees) in either direction respective to a known base orientation. Assuming that the user is facing forward in the ride cart 112, the ride cart 112 orientation may be used as the known base orientation to define the range of face rotation. Additionally or alternatively, if the guest's body orientation is known, this can also be used as the known base orientation to define the range of face orientation. By way of example, when using the ride cart 112 orientation as the known base orientation and the ride cart 112 orientation is 45 degrees, the guest's range of face rotation may be defined as the known base orientation plus or minus the maximum head rotation. Here, the guest's range of face rotation would be 45 degrees plus or minus 90 degrees, resulting in a range of −45 to 135 degrees. Similar calculations may be made using the guest's body orientation as the known base orientation.

In some embodiments, fast pace rides 100 may use less granular analysis of face orientation and may use skeletal tracking and the ride cart 112 data to determine face orientation. By way of example, the ride cart 112 orientation determination using the techniques previously described (e.g., known front and back of the ride cart 112, the ride path 108, the ride track 116, and the show scene features 110 on the ride path 108) may indicate a probable body positioning of a guest based on the ride cart 112 orientation and any show scene features along the ride path 108 that the guest may view. Thus, the ride cart 112 data may indicate the guest's general position within the ride cart 112 and relative position to a show scene feature that may be located along the ride path 108. Moreover, a skeletal model from skeletal tracking may further provide accurate body and face orientation of the guest. The positioning of joints closer together towards one end of the skeletal model may indicate that the guest is turned in the same direction as the show scene feature along the ride path 108. Thus, the ride cart 112 data in conjunction with skeletal tracking may be used for face orientation determinations.

On the other hand, slower pace rides 100 may use relatively more granular analysis of face orientation, such as to include a facial feature analysis. However, a skeletal image provided by skeletal tracking may not indicate precise facial features. Thus, the skeletal image data may be further processed to identify faces using facial recognition and/or body shapes using body recognition.

In some embodiment, such as for slower pace rides 100, facial image detection may consider multiple facial features as a whole to determine that a face has accurately been detected. The features considered may be points of facial interest and their intersection (e.g., two eyes aligned along a horizontal line in close proximity to a nose along a vertical line, detected at or near a point between each eye). Furthermore, the cameras 114 may be used for full body detection or upper body detection depending on the cameras 114 viewing range, such that body features may be used to precisely identify a guest orientation (e.g., guest facing forward). For example, the body detection features may consider body features and their intersection, such as face, arms, and legs. Body detection may further indicate the orientation of a guest's body and predict the guest's face orientation and/or future face orientation. By way of example, if a guest's face is detected to be facing forward but the body is detected to be turned slightly right, the face orientation may be predicted to also turn right. Additionally or alternatively, the ride cart 112 data indicating the ride cart 112 position on the ride path 108 and relative position to a show scene feature, may be used in conjunction with body and/or facial image detection to predict future orientation of a face rotation. Moreover, the cameras 114 may be used for thermal recognition to detect body-heat, which may be used to further accurately predict presence and orientation of a guest. Furthermore, the cameras 114 may also include infrared (IR) capabilities, such that the camera may provide night vision, thereby detecting guests in both the day and night. The IR capabilities may also be used for the IR makers to detect the ride cart 112, as discussed above.

Some of the different types of sensors, such as the RFID tags 118, the IR markers 119, and/or the cameras 114 input used to detect the ride cart 112 positioning within the ride 100 to generate the 3D map, may be used in conjunction with additional camera 114 input used to determine a guest's body and/or face, such as by skeletal tracking. Thus, based on the detection of a present ride cart 112 at a particular position within the ride 100, the cameras 114 may be initialized for skeletal tracking, body detection, and/or facial detection to determine face orientation. In certain embodiments, after determining the face orientation of a guest, show scene features may be initialized to provide entertainment to the guest facing the feature within a predetermined range. That is, if a sensed distance is less than a threshold and/or if the guest is within a hypothetical field of view of a show scene feature, and the guest is determined to be facing the feature, animations or effects may be triggered.

As previously mentioned, after determining the ride cart 112 positioning in conjunction with the guest's body and/or head positioning used to determine a guest's face orientation (e.g., face is rotated right relative to the body), algorithms of the face orientation system may be modified based on machine learning. Specifically, face orientation determination algorithms may be changed in response to ongoing or periodic determinations. By way of example, if a face orientation of a guest is determined to be positioned towards a show scene feature at a particular point on the ride path 108, then the show scene controller 110 may learn via machine learning to predict a face orientation at the same position. Similarly, if a face orientation is determined to be forward facing at particular points on the ride path 108, then the show scene controller 110 may make similar predictions using machine learning. Moreover, machine learning may be used for predicting face rotations as faces are determined to rotate at particular points on the ride path 108. Thus, machine learning may be used to identify a pattern of face orientations and future rotations for the show scene controller 110 to make accurate face orientation determinations and predictions. In accordance with certain aspects discussed herein, machine learning approaches that may be used to make predictions related to face detection and orientation, such as expected turning of a face, may further be used to accommodate a show scene animation or effect performed. Based on the face orientation determinations using detection mechanisms (e.g., the IR markers 119 to detect the ride cart 112, skeletal tracking and/or facial recognition to detect a face), machine learning may update or modify face orientation algorithms based on updated data, through performing detections and configuration changes, or through other suitable approaches.

Figure 2:
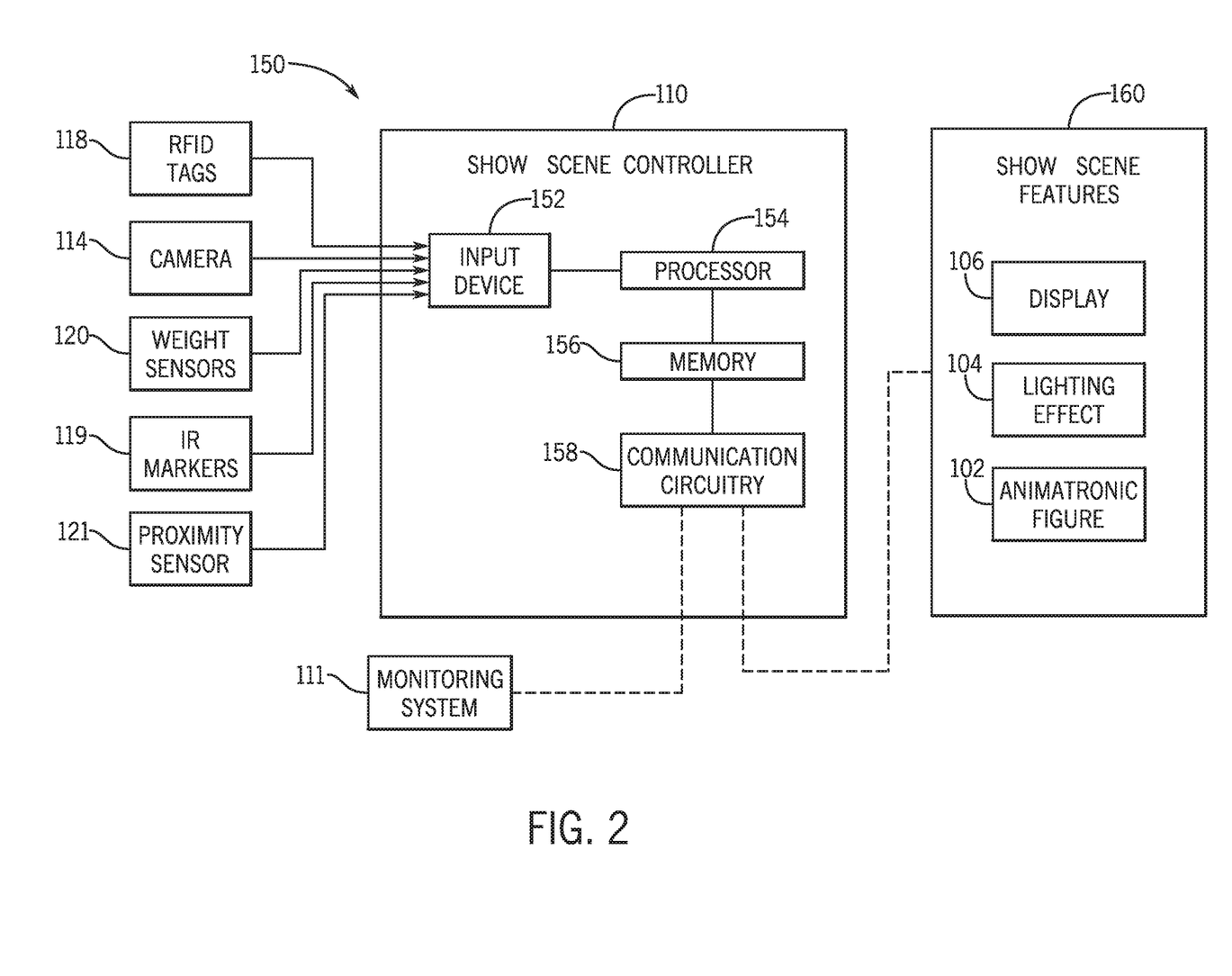
FIG. 2 is a schematic diagram of a face orientation system including a show scene controller used to control show scene features, in accordance with an embodiment.

As previously mentioned, the combination of detected sensor data indicative of the ride cart 112 orientation and/or guest positioning within the 3D map of the ride 100, may be sent to a show scene controller 110 of the face orientation system. The face orientation system may then use the sensor data to determine a face orientation and subsequently determine any changes to show scene features. To illustrate, FIG. 2 shows a block diagram of a face orientation system 150 with a show scene controller 110 used to control show scene features 160, which may include the display 106, the lighting effect 104, and the animated figure 102. The show scene controller 110 (e.g., electronic controller) may include a memory 156, a processor 154, a communication circuitry 158, and an input device 152. In certain embodiments, the memory 156 is configured to store instructions, data, and/or information, such as a database of images, animations, or effects for the show scene features. Additionally or alternatively, the memory 156 may include a user-defined algorithm for generating a 3D map of the ride cart 112 within the ride and an algorithm for determining face orientation. It should be noted that although examples provided herein may explicitly depict and describe the show scene features as limited to the display 106, the lighting effect 104, and/or an animated figure 102, the approaches disclosed may include using face orientation to control other show scene features or effects on the ride path 108, such as changing the ride track 116 path.

As discussed in more detail below, in certain embodiments, the processor 154 is configured to receive inputs signals from the input device 152 relating to detecting the ride cart 112 position and/or guest's orientation from one or more sensors previously described, which may then be used to determine face orientation using techniques described herein. Subsequently, an image, effect, or animation from the database may be provided based on the determined face orientation and guest positon within the ride, in accordance with the position of the ride cart 112. In this manner, the show scene controller 110 may determine face orientation and further control the show scene features accordingly when a guest is within a predetermined range of a particular show scene feature and/or when the guest's face is determined to be oriented toward the particular show scene feature. The sensor data may be provided to the input device 152 by the camera(s) 114, the weight sensor(s) 120, the IR markers 119, the RFID tags 118, and/or the proximity sensor(s) 121, as previously described. It should be understood that the illustrated system is merely intended to be exemplary, and that certain features and components may be omitted and various other features and components may be added to facilitate performance, in accordance with the disclosed embodiments.

Based on the received sensor data to the input device 152, the show scene controller 110 may facilitate control of the show scene features 160 using the processor 154 to select images to be displayed, animations to be implemented, and special effects that may be stored in a database of the memory 156. The database may include, for example, a list of available images, such as images related to the theme of the ride. By way of example, the ride 100 of FIG. 1 depicts a circus theme, and thus, circus images may be displayed on the display 106 when a guest face is facing the display 106. The database may also include animations to be performed by the animated figure 102 (e.g., clown). Continuing with the circus theme example, animations may include, but are not limited to, juggling, laughing and waving, saying a greeting, etc. Furthermore, the lighting effect 104 options may include colored lighting, strobe lighting, shadow lighting, and/or lighting to create circus related images displayed throughout the ride path 108 (e.g., tunnel wall on the ride path 108).

In the depicted embodiment, the processor 154 of the show scene controller 110 may execute instructions stored in the memory 156 to perform operations, such as generating the 3D map, determining face orientation based on the sensor data received at the input device 152, and selecting or changing the show scene features 160 (e.g. cause the animated figure 102 to juggle when a detected face is oriented towards the animated figure 102). As such, in some embodiments, the processor 154 may be one or more general purpose microprocessors, one or more application specific processors (ASICs), one or more field programmable logic arrays (FPGAs), or any combination thereof. Additionally, the memory 156 may be a tangible, non-transitory, computer-readable medium that stores instructions executable by and sensor data to be processed by the processor 154. Thus, in some embodiments, the memory 156 may include random access memory (RAM), read only memory (ROM), rewritable non-volatile memory, flash memory, hard drives, optical discs, and the like.

Furthermore, the show scene controller 110 may enable the communication circuitry 158 to interface with various other electronic devices, such as the monitoring system 111. The monitoring system 111 may use the generated 3D map and/or face orientation determinations for further analysis (e.g., to update the 3D map algorithm). Additionally or alternatively, the show scene controller may enable the communication circuitry 158 to interface with components of the show scene features 160. For example, the communication circuitry 158 may allow the show scene controller 110 to communicatively couple to a network, such as a personal area network (PAN), a local area network (LAN), and/or a wide area network (WAN). Accordingly, in some embodiments, the show scene controller 110 may process data from the input device 152, determine face orientation and position of guests within the 3D map, determine changes (e.g., animations or effects) to be implemented, and communicate the changes to the show scene features 160 via the communication circuitry 158. For example, after processing sensor data inputs from the input device 152, the processor 154 may determine a control signal that enables the communication circuitry 158 to wirelessly transmit control data to the show scene features 160 to enable activation of the changes. In other embodiments, the communication circuitry 158 may be connected via a wired connection to the show scene features 160.

In some embodiments, once the control signal is sent from the show scene controller 110 to the show scene features 160, the show scene features 160 may execute the corresponding change, such as an animation implemented by the animated figure 102, an image to be displayed on the display 106, or producing a visual effect with the lighting effects 104. Additionally, although not explicitly shown, components used to implement changes in the display 106, the lighting effect 104, and/or the animated figure 102, may include a respective processor, a respective memory, a respective communication device, and one or more actuators.

Figure 3:
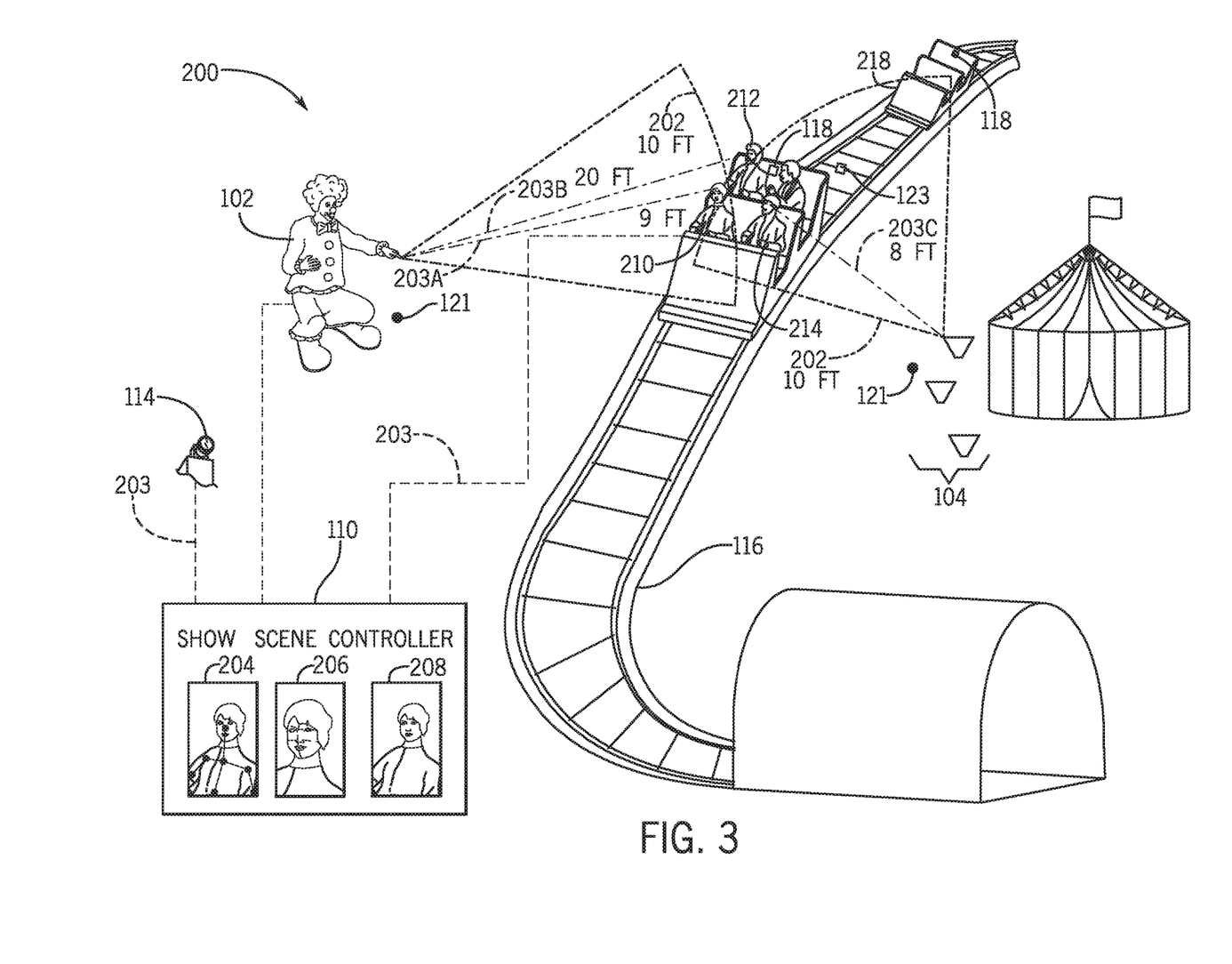
FIG. 3 is a block diagram of the face orientation system of FIG. 2 using skeletal tracking to determine a face orientation, which is subsequently used to control an animated figure, in accordance with an embodiment.

FIG. 3 is a block diagram 200 of an embodiment of use of the face orientation system 150 used to detect face orientation using skeletal tracking and facial recognition, that is subsequently used to control the animated figure 102, in accordance with aspects of the present disclosure. The depicted embodiment may include the animated figure 102 changing or interacting with guests when the guests are facing or looking at it. As shown, the cameras 114 are positioned to view both the ride cart 112 and guests that may come within a particular range or distance 202 of the animated figure 102 (e.g., as estimated by a proximity sensor 121 or the 3D map) in the show scene that may trigger animation of the animated figure 102 when the guests are facing the animated figure 102. The sensed data 203 provided by the cameras 114 and/or sensors, such as the depicted RFID tag 118, may be communicated to the show scene controller 110. Based on the RFID reading by the electronic reader 123, the one or more cameras 114 may be initialized or turned on to detect orientation of the ride cart 112 and face orientation. As previously discussed, an array of strategically placed ride cart 112 presence sensors (e.g., the RFID tags 118) throughout the ride 100 may be used to activate the cameras 114 in sequence or at specific tracked points along the ride 100 in order to preserve power.

In the present embodiment, sensed data 203 may be sent to the show scene controller 110 to indicate that the RFID tag 118 associated with the ride cart 112 passes the electronic reader 123, which may indicate the expected location of the ride cart 112 on the ride track 116. This determination may indicate the position of the ride cart 112 on the ride track 116, such as the ride cart 112 is positioned slightly left based on a known ride track 116 arrangements arrangement. The determination may be based on multiple electronic readers 123 that are placed throughout the ride track 116 such that each electronic reader 123 indicates a respective point on the ride track 116. By way of example, a particular electronic reader 123 may indicate a midpoint on the ride electronic 116, and the midpoint may include the ride track 116 that turns, indicating that the ride cart 112 on a turning ride track 116 may also be turning. Moreover, the ride cart's 112 positioning within the ride 100 and the ride tracks 116 may indicate current or expected position next to the show scene features 160, such as the animated figure 102. The positioning of the ride cart 112 may provide context for determining the direction that guests may be facing. For example, the ride cart 112 is facing forward or in line with the ride direction, and thus, guests are likely facing forward. Additionally or alternatively, the ride cart 112 position may be determined by generating the 3D map using captured images by the cameras 114 and/or known layout of the ride 100 (e.g., the ride path 108, the ride track 116, and the show scene features 160, etc.).

Once the ride cart 112 positioning has been determined and the cameras 114 are activated, the cameras 114 may focus on the view of the ride cart 112 to detect guest body and/or head position and determine their face orientation. Using different recognition techniques, such as but not limited to, skeletal tracking and/or facial recognition, as previously discussed, the show scene controller may determine face orientation. As depicted, multiple guests may be in the ride cart 112 and the cameras 114 may observe each guest simultaneously or individually. Accordingly, the show scene controller 110 may detect and track the presence of the multiple guests using skeletal tracking to detect skeletal body features, such as a skeletal head and/or body. In some embodiments, a skeletal reading 204 sent to the show scene controller 110 may subsequently trigger face detection. The facial recognition techniques may use the skeletal tracking readings to focus on the skeletal image and find arms, chest, eyes, nose, etc. to generate a facial image 206. In this manner, the show scene controller may use the ride cart 112 orientation within the ride 100 in conjunction with body/face orientation techniques, as previously described, to determine and generate a face orientation image 208. Additionally or alternatively, the face orientation image 208 may include additional images indicative of predicted face turns or positioning. Furthermore, the show scene controller 110 may use machine learning to update its face orientation detection determinations and predictions on guests at the particular position within the ride 100 based on reoccurring body and face positions and their resulting face orientation determinations.

Furthermore, the face orientation determination for the one or more guests in the ride cart 112 may be used to initialize or change show the scene features 160, such as the animated figure 102 and the lighting effect 104 in the depicted embodiment. As shown, a first guest 210 and a second guest 212 may be positioned closest to the animated figure 102. Based on the show scene controller 110 predefined settings (e.g., designer or operator defined settings), the animated figure 102 may be instructed to react to guests that are within a particular distance 202 (e.g., 3 meters) and facing its direction. Here, although the faces of both the first guest 210 and the second guest 212 are turned to face the animated figure 102, the first guest is within the particular distance 202 for the animated figure 102 to interact with the first guest 210 while the second guest 212 is out of range. Specifically, the first guest 210 is in a 3 meter distance 203A from the animated figure 102, which is within the particular distance 202 of 3 meters. However, the second guest 212 is in a 6 meter distance 203B from the animated figure 102, and thus, not within the particular distance 202. Moreover, a third guest 214 is in a 2 meter distance 203C, which is within the 3 meter particular distance 202 from the lighting effects 104 surrounding a circus tent feature. Although the third guest 214 is within the particular distance 202, the guest's face is determined to be oriented to the left and away from the lighting effects 104. Thus, show scene features may be triggered in response to a guest determined to be within the particular distance 202 and facing the show scene feature. Using the face orientation techniques described herein, the show scene features, such as the lighting effects 104, may conserve power and continue being powered off in response to no guests determined to be facing the show scene feature within the particular distance 202.

Moreover, in some instances an empty ride cart (e.g., no guests in the ride cart) or a ride cart with fewer than a maximum number of guests may be present. As illustrated in the current embodiment, a subsequent ride cart 218 that is empty follows the ride cart 112 as the carts continue moving forward within the ride 100. The subsequent cart 218 may also include the RFID tags 118, which may be used to indicate the presence of the subsequent ride cart 218. In some embodiments, the detection of the subsequent ride cart 218 may cause the cameras 114 to generate a 3D map of the ride cart 112, and further initialize skeletal tracking. However, skeletal tracking would generate results indicating that no human skeletons are detected. Since guests are not detected, show scene features, such as the animated figure 102 and the lighting effects 104 may remain powered off, thereby conserving power.

Figure 4:
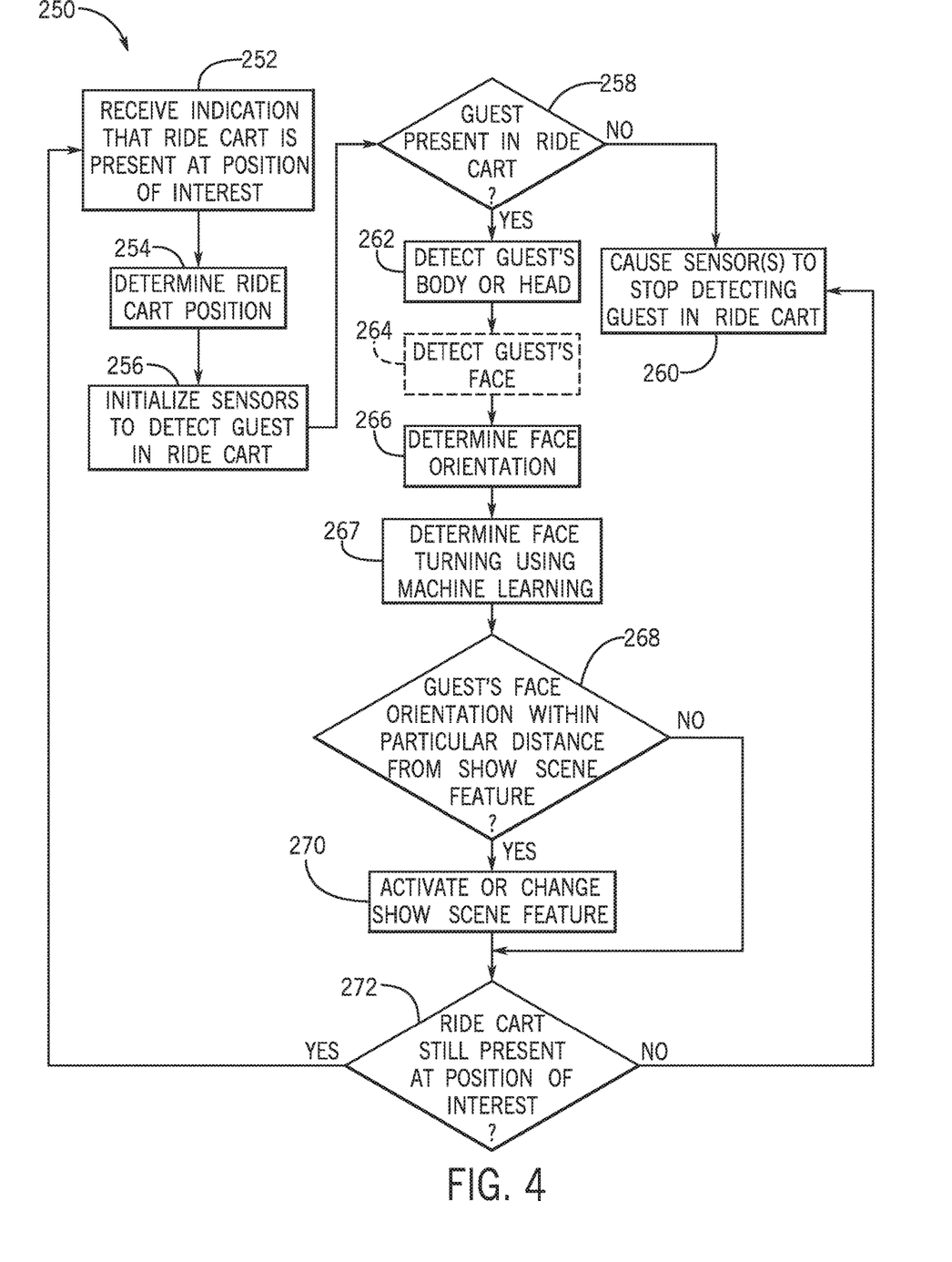
FIG. 4 is a process flow diagram of determining a guest's face orientation, in accordance with an embodiment.

FIG. 4 is a process flow diagram for a method 250 for generating face orientation determinations using the show scene controller 110 of the face orientation system 150 of FIGS. 2 and 3. It should be noted that the method 250 may be performed as an automated procedure by a system, such as the face orientation system 150 including the show scene controller 110 and/or the show scene features 160. Although shown in a particular sequence, it should be noted that the operations described with respect to the method 250 may be performed in different orders than shown and described and, indeed, such permutations of the method 250 are encompassed by the present disclosure. Further, certain steps or portions of the method 250 may be omitted and other steps may be added. The method 250 may be carried out in response to guests on a ride.

In some embodiments, the show scene controller may receive an indication (block 252) that the ride cart 112 is present at a position of interest. The position of interest may be a particular range in front of, behind, or adjacent to the show scene features 160, such as the animated figure 102. Additionally or alternatively, the position may be based on the ride path 108 data. The memory 156 of FIG. 2 may store the ride path 108 data that includes information about the ride cart's 112 position along the ride path 108 as a function of time and/or other factors, which may be used to determine whether the ride cart 112 is present at the position of interest. In one embodiment, electronic readers 123 associated with the ride cart 112 may be scanned as the ride cart 112 traverses the ride path 108. The RFID signals observed along the ride path 108 may provide an indication of the ride cart 112 location. Further, in some embodiments, an amount of elapsed time and/or other factors may be used to identify the location of the ride cart 112, enabling the show scene controller 110 to determine when the ride cart 112 has reached the position of interest. In some embodiments, the sensor data input (e.g., via the cameras 114, the weight sensor 120, the IR markers 119, and/or the RFID tags 118), or the like may be used to identify the ride cart 112 position and thus whether the ride cart 112 is at the position of interest.

Furthermore, the show scene controller 110 may use sensor data input to determine (block 254) the ride cart 112 position within the ride 100 (e.g., the ride path 108 or the ride 116) by generating a 3D map of the ride cart 112 position using techniques previously described. As previously described, the 3D map generation may be based on the known ride track 116 position and orientation, and known features within the ride 100 (e.g., the ride track 116 turns towards a show scene feature at a midpoint on the ride). For example, the 3D map may generate the ride cart's 112 orientation, such as degree of turn or tilt, based on the ride track 116 positioning. Moreover, guest position data within the 3D map may be based on the ride cart 112 orientation and known ride cart 112 (e.g., seats are forward facing as the ride cart 112 moves along the ride path 108). Thus, the ride cart 112 position may also be indicative of a guest position within the ride 100.

After receiving indication that the ride cart 112 is positioned in the area of interest and determining the ride cart's 112 positioning, the show scene controller 110 may initialize (block 256) sensors to detect one or more guests in the ride cart 112. For example, the show scene controller 110 may output one or more signal(s) to activate the cameras 114 used for the skeletal tracking, facial recognition, and/or body recognition to begin detecting the guest's face position in the ride cart 112. For example, guest presence may be detected by a discernable pattern (e.g., continuous solid color or design) on the back of the ride cart 112 seat in an image captured by the cameras 114. In response to a guest in the seat, the pattern may not be visible (e.g., a break in the continuous solid color or design due to the guest covering up part of the pattern), indicating guest presence. On the other hand, when the seat is visible and the pattern is detectable, then the show scene controller 110 may determine that a guest is not present in the ride cart 112. This indicates no one is present in the seat. Moreover, skeletal tracking may be used to determine guest presence, such that when an intersection of essential joints, bones, and limbs of a human skeleton is determined, a guest may be present in the ride cart 112. On the other hand, if the skeletal tracking does not determine an intersection of skeleton joints, then a guest may not be present.

The show scene controller 110 may determine whether (decision block 258) input received from the cameras 114 is indicative of a guest present in the ride cart 112 within the viewing range. In addition to guest presence determined using the cameras 114 for pattern recognition on a seat or skeletal recognition, the RFID tags 118 in guest wearables may be scanned when a guest is seated in the ride cart 112 to indicate guest presence.

If the show scene controller 110 receives an indication of guest vacancy (e.g., the cameras 114 capture image of empty cart when skeletal recognition is executed), no further face orientation detection is needed, at least for a particular seat within the ride cart. Accordingly, the show scene controller 110 may cause (block 260) the guest detection sensors to stop detecting and/or processing guests in portions of the ride cart 112 where vacancy is indicated.

However, if the signal indicates that guests are present in the ride cart 112 seats, then the show scene controller 110 may continue to perform skeletal tracking recognition or tracking to detect (block 262) the guest's body and/or head. For example, the skeletal tracking may consider relative positioning of essential joints, bones, and limbs of a human skeleton to generate a skeletal model. As previously discussed, joints located closer together on the skeletal model may indicate that the body and/or head is turned towards the particular direction. Moreover, the ride cart 112 data that may take into account particular points on the ride track 116 and show scene features along the ride path 108, may be used in conjunction with the skeletal tracking to determine face orientation and make future face rotation predictions.

Additionally or alternatively to the skeletal tracking used to generate a skeletal image of a guest, facial and/or body recognition may be optionally executed (as indicated by a dashed line) to detect (block 264) the guest's facial features, such as for rides using a more granular analysis of face orientation. As previously described, facial recognition may include considering points of facial interest and their intersection (e.g., two eyes aligned along a horizontal line in close proximity to a nose along a vertical line, detected at or near a point between each eye). Similarly, body detection may consider body features and their intersection, such as face, arms, and legs or upper body. Both facial and body recognition may allow for more accurate facial feature and/or body determinations, which may be used for face orientation and future rotation determinations. By way of example, a slow paced stand-up ride with guests standing in the ride cart 112 may utilize both body and face recognition techniques.

For example, in some embodiments, the skeletal image algorithms may indicate a guest's body orientation within the ride cart 112 by observing the relative closeness of skeletal joints. This information may provide an indication of likely body and, thus, face orientation. By way of example, knee joints close together and turned towards a particular side (e.g., the left side) of the ride cart 112 may indicate the guest's body and head is turned in this orientation (e.g., to the left).

Similarly, facial recognition algorithms may indicate orientation of the face based on the closeness of detected facial features. For example, when facial features (e.g., eyes) are detected towards one side of the face, this may indicate that the face is turned in a direction corresponding that side of the face (e.g., eyes detected towards the left side of the face may indicate that the guest if facing left).

By using both the skeletal tracking and facial and/or body recognition in conjunction with the previously determined ride cart 112 presence and positioning within the ride 100, the show scene controller 110 may determine (block 266) the face orientation of the guest. Specifically, ride cart orientation is used as a baseline orientation for the body of a guest, which can then be combined with the skeletal and/or facial and body data to find the precise orientation of the face.

Furthermore, in some embodiments, machine learning may be used to determine (block 267) which way the face may be turning based on reoccurring face orientation determinations made for guests at the particular position within the ride 100. By way of example, if a face orientation of a guest is determined to be positioned to the left (e.g., towards a show scene feature) at a particular point on the ride path 108, then the show scene controller 110 may learn via machine learning to predict a face orientation as the same orientation for that position on the ride path 108. Moreover, the face orientation algorithms of the show scene controller 110 may be updated using machine learning for previously determined skeletal tracking and face and/or body recognition data and confirmed indications of actual facial orientations of the guests associated with the previously determined skeletal tracking and face and/or body recognition data. The face orientation algorithms may be updated in order to predict or determine more accurate face orientations and where the face orientation may be turning considering the positioning of the guest within the ride 100.

Next, the face orientation determination may be used to control the show scene features 160 along the ride path 108. The show scene controller 110 may determine whether (decision block 268) the guest's face orientation is within a particular distance from the show scene features 160. In other words, the show scene controller 110 may determine that the guest's face is oriented within the particular distance of the show scene feature when both the guest's face is within the particular distance of the show scene feature and the guest's face is determined to be oriented in a viewing range of the show scene feature.

If the face orientation is within the particular distance (e.g., within 3 meters circumference from the animated figure 102) and the user's face is oriented in the viewing range of the show scene feature, then the show scene feature may be activated (block 270) or updated to reflect a change, as previously described. By way of example, a guest's face orientation may be facing the animated figure 102 that is within a particular range of the guest, and the show scene controller 110 may send an animation control signal to the animated figure 102. The animation control signal may be processed by a processor of the animated figure 102 and cause the animated figure 102 to change, such as by smiling or waving using actuators, as described above.

However, if the guest's face orientation is not within the particular distance of the show scene features 160 or is not oriented in a viewing range of the show scene features 160, then the show scene feature is not activated. This provides a more personalized experience that may reduce power usage and/or wear on the show scene features.

In some situations, the guest may orient towards the show scene feature after an initial detection that the guest's orientation is not within the predetermined distance of the show scene feature. Accordingly, additional orientation determinations may be performed. In such a case, the show scene controller 110 may determine whether (decision block 272) the ride cart 112 is still present at a position of interest as it moves along the ride path 108. Continuing with the animated figure 102 example, if the animated figure 102 is no longer within the particular distance 202 from the guest facing the animated figure 102, then the show scene controller 110 may cause (block 260) the sensors (e.g., the cameras 114) to stop detecting guests on the ride cart 112.

However, if the ride cart 112 continues to be positioned at a point of interest, then the show scene controller 110 may receive (block 252) indication that the ride cart 112 is present at the point of interest and take subsequent steps of determining ride cart 112 positioning, initialize sensors to detect guests on the ride cart 112, etc.

As may be appreciated, the current techniques, which relate to facial orientation detection based upon contextual data related to a ride and/or guest's body may provide significant benefits. For one, less granular analysis of facial orientation may provide increased efficiencies in orientation processing, which may be especially useful in fast paced amusement rides. Further, triggering show scene features based upon the detected facial orientation may provide increased power utilization efficiencies, may reduce wear on the show scene features, and/or may provide a more personalized ride experience.

While only certain features of the disclosure have been illustrated and described herein, many modifications and changes will occur to those skilled in the art. It is, therefore, to be understood that the appended claims are intended to cover all such modifications and changes as fall within the true spirit of the disclosure. It should be appreciated that any of the features illustrated or described with respect to the figures discussed above may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A face orientation system of a ride, comprising:
   one or more sensors; and
   a controller configured to:
      receive ride cart data from the one or more sensors, the ride cart data indicative of a presence and position of the ride cart on the ride;
      determine ride cart orientation based on the ride cart data;
      receive position data of a guest from the one or more sensors, the position data indicative of a position of a body, a face, or a combination thereof, of the guest;
      determine face orientation, face rotation, or a combination thereof, of the guest based at least in part upon the ride cart orientation and the position data; and
      transmit data indicative of the determined face orientation, face rotation, or a combination thereof to a downstream controller for subsequent control based upon the determined face orientation, face rotation, or the combination thereof.

2. The face orientation system of claim 1, wherein the position data comprises a skeletal image determined by skeletal tracking.

3. The face orientation system of claim 2, wherein determining the skeletal image by skeletal tracking comprises determining a position of essential joints, bones, and limbs of the guest to generate the skeletal image.

4. The face orientation system of claim 2, wherein the face orientation, face rotation, or a combination thereof, is predicted based on the ride cart orientation, the skeletal image, show scene features within a viewing range, or a combination thereof.

5. The face orientation system of claim 2, wherein the controller is configured to disregard ride cart data or face position data in response to the one or more sensors detecting an absence of the guest in the ride cart.

6. The face orientation system of claim 5, wherein the detecting the absence of the guest in the ride cart is based on the skeletal image, a pattern recognition, a radio frequency identification (RFID) tag, or a combination thereof.

7. The face orientation system of claim 5, comprising detecting the absence of the guest in the ride cart based on a recognized pattern of a continuous solid color, design, or a combination thereof, on a ride cart seat.

8. The face orientation system of claim 1, comprising the downstream controller, wherein the downstream controller comprises a show scene controller that controls one or more scene features based upon the determined face orientation, face rotation, or the combination thereof, wherein the show scene controller, the controller, or a combination of the show scene controller and the controller are configured to:
   determine if the guest is within a particular distance of one or more show scene features of the ride;
   in response to determining that the guest is within the particular distance, determine a change to the one or more show scene features based on the face orientation; and
   transmit a control signal to trigger a change to the one or more show scene features.

9. The face orientation system of claim 8, wherein the one or more show scene features comprise an animated figure, a display, a light effect, or a combination thereof.

10. The face orientation system of claim 9, wherein the change comprises an animation of the animated figure, a displayed image on the display, a lighting of the light effect, or a combination thereof.

11. The face orientation system of claim 10, wherein the change is determined in response to the face orientation of the guest facing the one or more show scene features within a viewing range.

12. A method, comprising:
   receiving ride cart data from one or more sensors indicative of a presence and position of a ride cart on a ride;
   determining a ride cart orientation based on the ride cart data;
   receiving position data of a guest from the one or more sensors, the position data indicative of a position of a body, a face, or a combination thereof, of the guest;
   determining face orientation, face rotation, or a combination thereof, of the guest based at least in part upon the ride cart orientation and position data; and
   transmitting data indicative of the determined face orientation, face rotation, or a combination thereof to a downstream controller for subsequent control based upon the determined face orientation, face rotation, or the combination thereof.

13. The method of claim 12, wherein the position data comprises a skeletal tracking image, a facial recognition image, a body recognition image, or a combination thereof.

14. The method of claim 12, wherein the one or more sensors include radio frequency identification (RFID) tags, proximity sensors, infrared (IR) markers, weight sensors, cameras, or a combination thereof.

15. The method of claim 14, wherein the RFID tags, the IR markers, or a combination thereof, are placed on a ride path of the ride at one or more points of interest to track or predict the position of the ride cart within the ride path.

16. A tangible, non-transitory, machine readable medium comprising machine-readable instructions that, when executed by one or more processors of the machine, cause the machine to:
   receive ride cart data from one or more sensors indicative of a presence and position of a ride cart on a ride;
   determine a ride cart orientation based on the ride cart data;

receive position data of a guest from the one or more sensors, the position data indicative of a position of a body, a face, or a combination thereof, of the guest;

determine face rotation of the guest based at least in part upon the ride cart orientation and the position data; and transmit data indicative of the determined face orientation, face rotation, or a combination thereof, to a downstream controller for subsequent control based upon the determined face orientation, face rotation, or the combination thereof.

17. The machine readable medium of claim 16, wherein the position data comprises a skeletal tracking image, a facial recognition image, a body recognition image, or a combination thereof.

18. The machine readable medium of claim 16, wherein the determined face rotation of the guest is based on:

a relatively less granular analysis comprising a facial recognition analysis for a fast paced portion of the ride; and a relatively more granular analysis that uses the ride cart orientation, the position data of the guest, or both as a known base orientation for a slow paced portion of the ride.

19. The machine readable medium of claim 16, wherein a 3D map of the guest on the ride is generated based on the ride cart data, guest position data, and the ride cart's position data, wherein the 3D map indicates the determined face orientation of the guest relative to show scene features of the ride.

20. The machine readable medium of claim 19, wherein the 3D map is used to precisely determine facial features, face position, face turning, or a combination thereof, and wherein the determined face orientation uses machine learning to accurately predict face position based on reoccurring face orientation determinations made for specific parts of the ride within the 3D map.

21. The machine readable medium of claim 16, wherein a 3D map is used to determine the ride cart orientation based on a known ride track position and a known ride track orientation within the ride.

* * * * *